Nov. 21, 1961 J. R. BAYSTON ET AL 3,009,336
ICE MAKING MACHINE
Filed Sept. 4, 1956 5 Sheets-Sheet 3

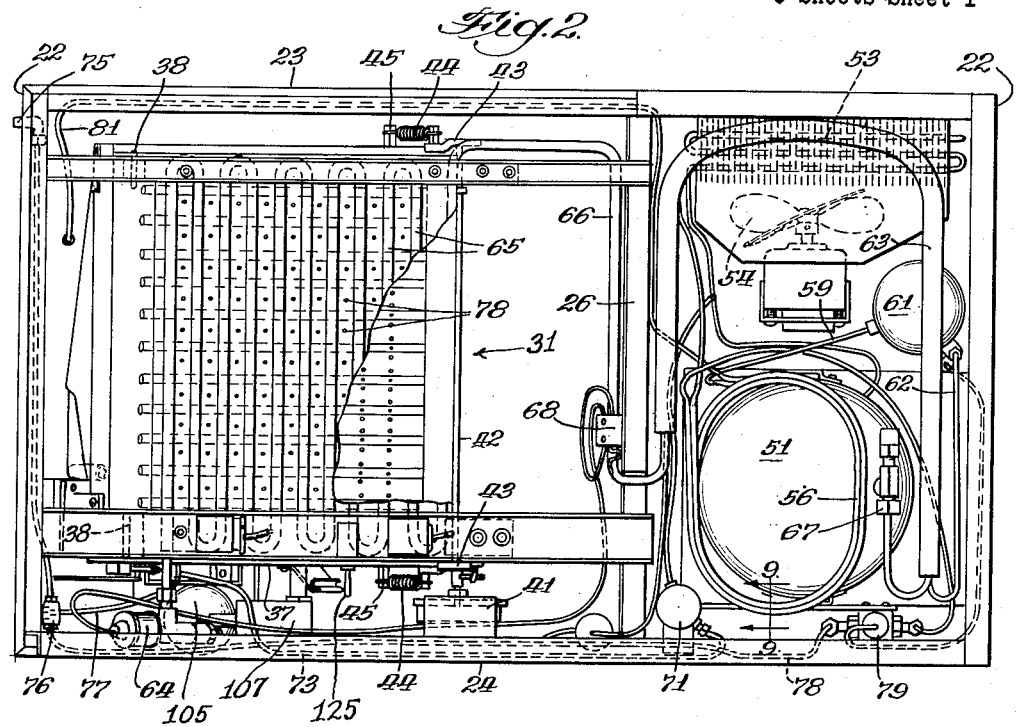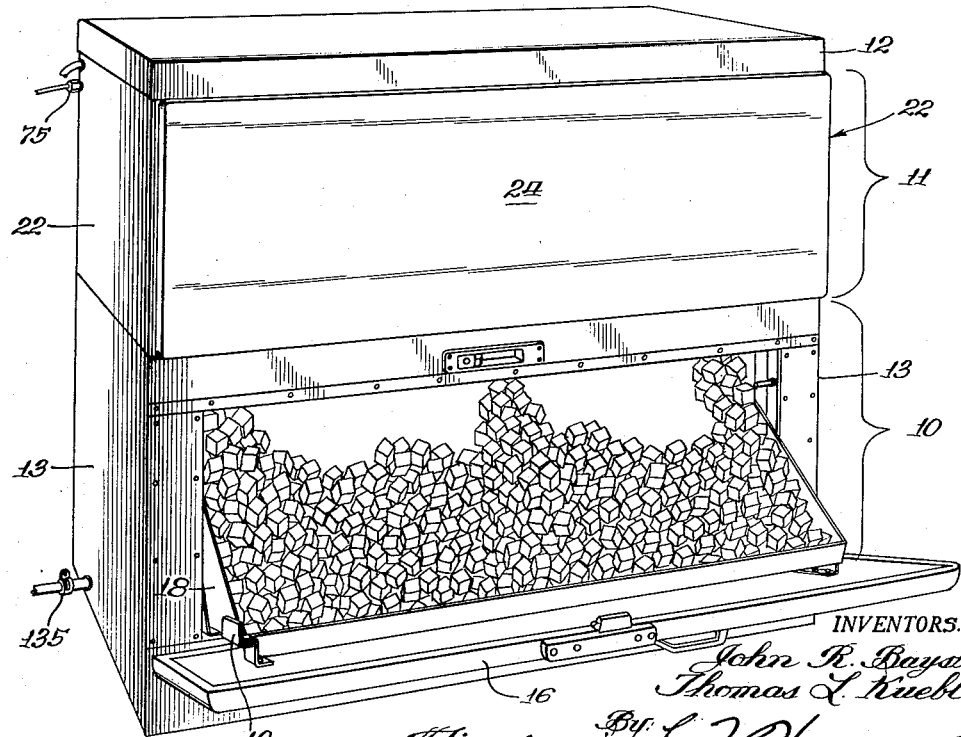

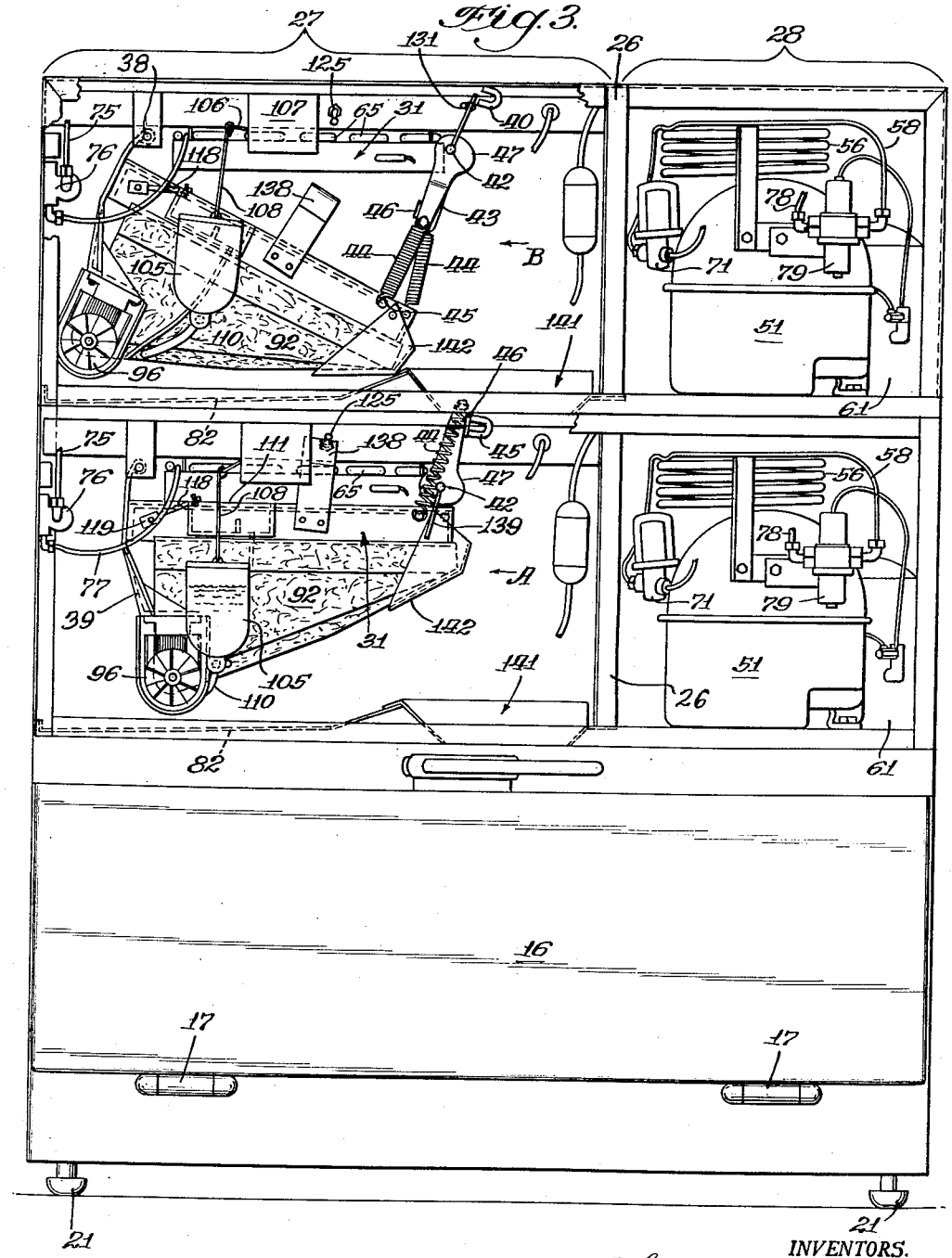

INVENTORS.
John R. Bayston
Thomas L. Kuebler
By L. F. Hammand
Atty.

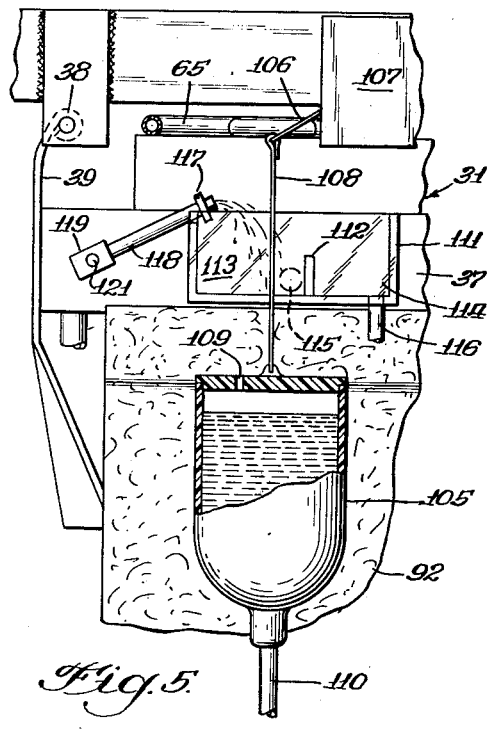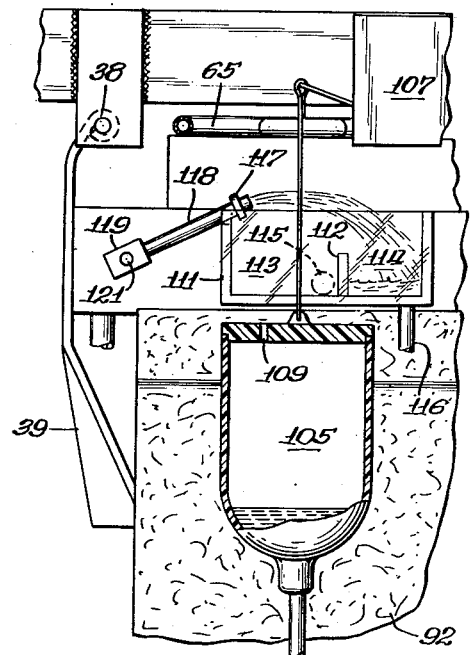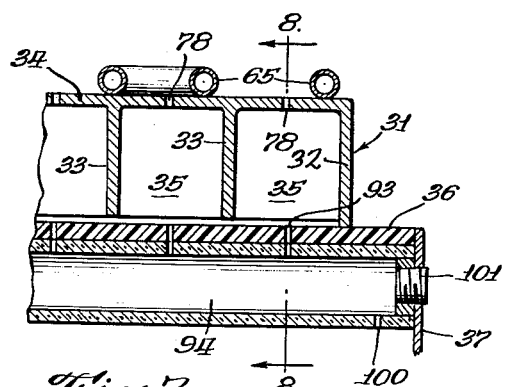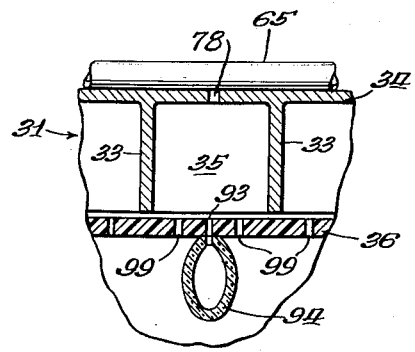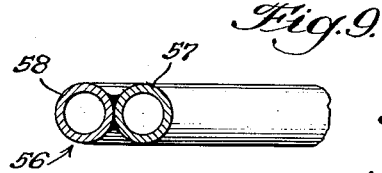

Nov. 21, 1961  J. R. BAYSTON ET AL  3,009,336
ICE MAKING MACHINE
Filed Sept. 4, 1956  5 Sheets-Sheet 5

INVENTORS.
John R. Bayston
Thomas L. Kuebler
By L. F. Hammond
Atty.

3,009,336
ICE MAKING MACHINE
John R. Bayston and Thomas L. Kuebler, Erie, Pa., assignors to John R. Bayston, as trustee of Icecrafter (Liquidating) Trust, Van Nuys, Calif.
Filed Sept. 4, 1956, Ser. No. 607,801
9 Claims. (Cl. 62—344)

It is the principal aim of the present invention to provide a new and improved automatic ice making machine capable of producing a continuous and adequate supply of pure, clear, sanitary ice cubes; and particularly to manufacture these cubes in uniform, regular cubical shape and characterized by absence of any holes, porosity or cloudiness. It is among the more specific aims of the invention to provide a machine capable of this performance which is nevertheless flexible in design and simple, efficient and dependable in operation.

In the present invention ice is frozen by a continuous circulation of water through a freezing chamber consisting of a plurality of individual cells, so that the constant flow of water washes the surface of the cubes as they are being frozen. This causes most of the minerals, solids and air present in the water supply to accumulate in the dreg water subsequently discharged from the system. Since the dreg water discharged from the machine carries most of the water impurities with it, the ice cubes delivered to the ice bin are actually much purer than the water entering the machine. As a result, the individual cubes are frozen in super-hard, clear, solid form.

The machine is so constructed that the water circulating system is formed of materials which are not damaged by freezing, and which resist any appreciable accumulation of mineral deposits. Also, an improved condensing system having an auxiliary water cooling coil is provided to assure full capacity ice cube production irrespective of room temperature.

It is one of the important objects of the present invention to provide an improved and simplified automatic control system for an automatic ice making machine whereby successive batches of ice cubes may be frozen and then automatically discharged into a storage bin without outside attention and without touching the cubes. Further objects are of course to provide such a machine with mechanical actuating and control mechanisms having comparatively few moving parts, and with all parts easily accessible so that service problems and maintenance expense are reduced to a minimum.

Another importance object of the invention is to provide an improved method of controlling the duration of the freezing cycle of the mechanism. Previously, this has been conventionally accomplished either by thermostat, timer or float valve, but there are various shortcomings inherent in all of these arrangements. By the present invention, the termination of the freezing cycle and the flushing out of the dreg water is accomplished simultaneously, by an extremely simple yet dependable arrangement of parts.

In the present invention, a water nozzle in communication with the water supply line from the circulating pump directs a stream of water in an upwardly inclined lateral direction. At low pressure, the stream falls into a box or receptacle close to the end of the nozzle. At higher pressure, the stream is projected across a barrier into a water discharge trap and is drained away. This stream can thus be utilized as a control device, since when the recirculation system of the assembly is functioning normally the water openings into the individual freezing cells are completely open. This prevents the pump pressure from building up and it follows that as the freezing cycle progresses the water is discharged from the control nozzle and continuously returned to the recirculating system. When the ice cubes have formed, however, the ice closes the water inlets to the individual freezing cells. This raises the water pressure in the supply line sharply, and causes the stream from the control nozzle to overshoot the barrier and discharge some of the dreg water remaining in the circulating system into the drain. A water control tank connected from the tank by a hose is also emptied until it no longer overcomes the weight of a supporting spring on a switch to which it is attached. The spring then lifts the pilot tank, actuating a toggle switch to start the defrosting and cube discharging cycle.

Another of the features of novelty of the machine is the provision of a "sectional" machine wherein the base frame of the machine comprises the ice cube bin, with the base of the machine physically separate from one or more freezing units which may be stacked thereon. Thus two or more separate but identical freezing units may be stacked one upon another, in the same manner as the individual sections of a sectional bookcase. It follows that an assembly capable of a capacity of say 200 pounds of ice a day may be provided by using only one freezing unit, while a corresponding machine of the same floor size but capable of 400 to 600 pounds production per day may be provided merely by placing additional freezing units in stacked relation on top of the first. This is made possible by the fact that each of the individual freezing units is of design that it includes a generally vertical chute such that as the ice delivered from each of the superposed units may fall directly into the ice bin.

Further objects of the invention are to provide a freezing unit of greater efficiency than heretofore developed, capable of achieving greater ice production than similar units of the same power ratings. This is accomplished in part by a highly efficient heat exchanger and refrigerant evaporator, and partially by an improved refrigerant system employing an auxiliary water coil to maintain top efficiency of the freezing unit even under adverse conditions of operation.

The foregoing objects are well accomplished in an automatic machine as disclosed herein. The present preferred commercial embodiment of the commercial invention has accordingly been illustrated in the drawings of this specification.

In the drawings:

FIGURE 1 is a front perspective view of an ice making machine in accordance with the present invention, the cabinet of the machine being shown with the ice bin open;

FIGURE 2 is a fragmental plan view of the machine with cover removed;

FIGURE 3 is a front elevational view of a two unit machine similar to that shown in FIGURE 1. In the illustration, the front cover plates of the freezing units have been removed to show the internal mechanism;

FIGURES 5 and 6 are fragmental detail views, partly in section, showing the freezing cycle control mechanism employed by the present invention;

FIGURE 7 is a fragmental detail sectional view through the individual cells of the freezing chamber, showing the manner in which the water plate employed herein operates to close the open bottoms of the cells and to circulate water therethrough;

FIGURE 8 is a detail sectional view of the freezing chamber and water plate construction taken substantially on the plane of the line 8—8 of FIGURE 7;

FIGURE 9 is a detail sectional view through a double heat exchanger tube employed in the refrigeration system of the machine;

*The frame and cabinet construction*

Figure 4:
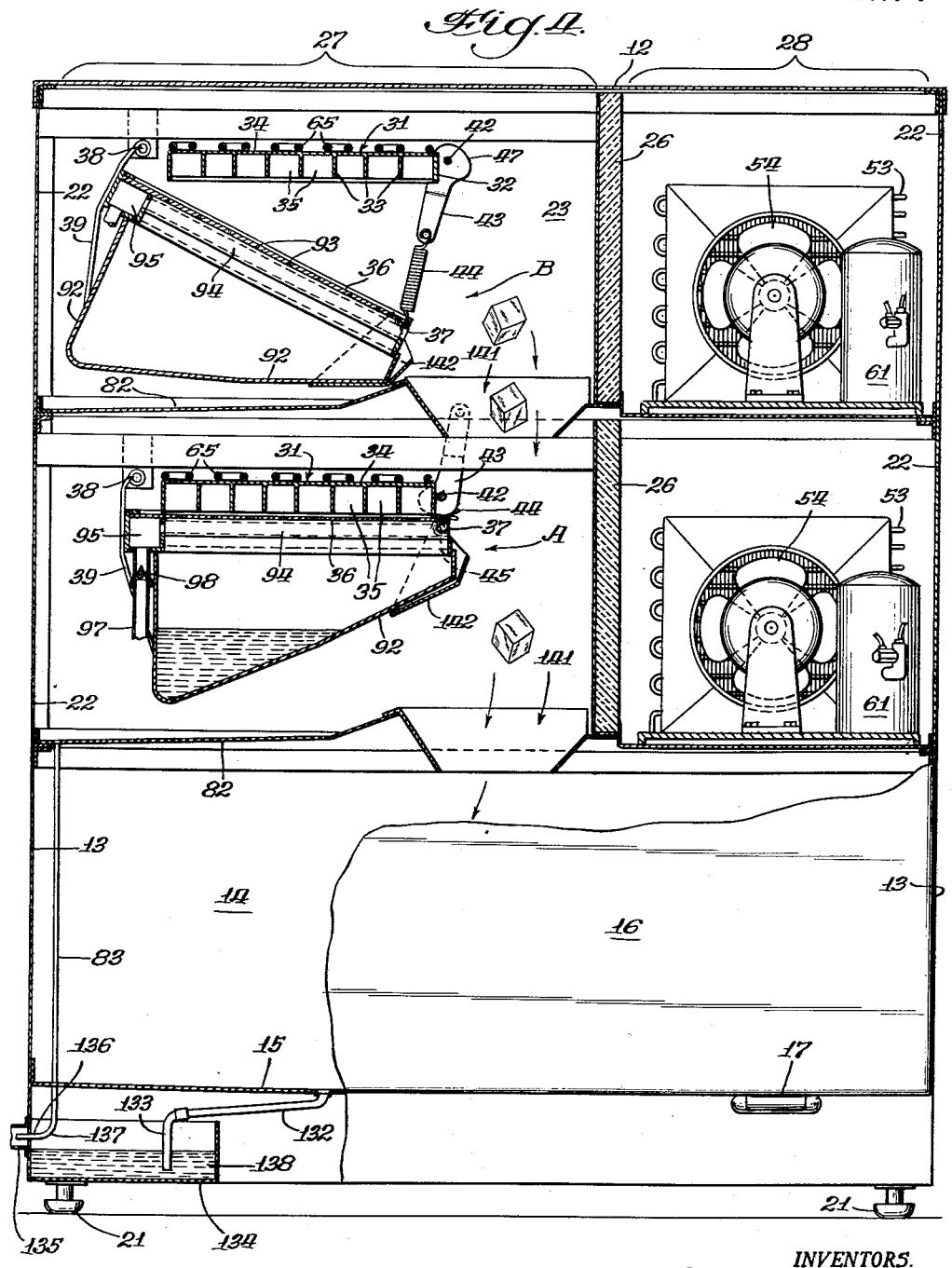
FIGURE 4 is a central sectional view through the machine illustrated in FIGURE 3.

It has been previously mentioned that it is one of the principal objects of this invention to provide a commercial ice making machine wherein one, two, three or more individual ice making units may be assembled to comprise a machine having an ice capacity suited to the particular requirements of any given location, and to have these units arranged to operate independently of each other yet to discharge the ice produced in each freezing unit into a common hopper or bin. To this end the machine is designed in somewhat sectional form, having a lowermost bottom or base section 10 upon which one or more freezing units 11 may be stacked. A cover 12 is provided so that the individual freezing units 11 may be of substantially identical internal construction and the individual units are of such construction that the ice produced in the uppermost sections may be discharged directly through the intermediate sections and into the bin 10 as will appear.

The lowermost section or base 10 of the machine comprises, in general, a pair of end walls 13, a back wall 13 and a bottom 15 (FIGURE 4) all of which may be appropriately lined with thermal insulating material (not shown) in a manner well understood in the art. The front of the machine is provided with an insulated door 16, hinged at 17 and preferably provided with an appropriate latch. In the preferred construction of the invention the interior of the lower section comprises an ice bin having a pivoted front plate 18 adapted to be engaged by brackets 19 on the inner face of the door 16, so that the front of the ice bin door will be tilted upward to give easy access to the ice cubes contained in the bin when the door is opened. Adjustable legs 21 may be provided on the section 10 to permit proper leveling of the machine on a floor surface.

The individual freezing units of the machine are best illustrated in FIGURES 1, 2, 3 and 4 from which will be seen that each of the superimposed freezing units 11 has a pair of end walls 22, back wall 23 and front panel 24 generally corresponding in size and shape to the conformation of the base section 10 and with the corresponding walls of all sections adapted to lie in contiguous flush relation to each other. Each of the freezing units 11 has a central partition 26, dividing the unit into an evaporator housing 27 at one end of the unit and a compressor housing 28 at the other end. The housing 28 serves to enclose the refrigeration equipment employed in each of the individual units and the housing 27 encloses the freezing chamber, ice making apparatus and control devices, as will appear.

*The freezing chamber and water plate*

The freezing apparatus employed in the present invention is characterized by a freezing evaporator generally designated as 31, consisting of a metallic grid having marginal walls 32 and shorter intersecting partition walls 33 all secured on the under side of a top plate 34 to form a multiplicity of individual open-bottom freezing cells 35, each of true cubical shape.

The open bottoms of the individual freezing cells 35 are arranged to be closed during the freezing cycle of the machine by a flat, plastic water plate 36 mounted in a rectangular frame 37 which is in turn pivoted on the pins 38 by a hinge 39. The hinged arrangement is such that the water plate may be raised into contact with the freezing cell grid in the position indicated at A when the freezing cycle is in process and may thereafter be lowered to the position B to permit release and discharge of the ice cubes from the freezing cells as will be hereinafter described (FIGURE 4). This rocking movement of the freezer plate is accomplished by a motor 41 (FIGURE 2) connected through appropriate reduction gearing to an operating shaft 42 having paired arms 43 each connected by a tension spring 44 to a lateral stud 45 projecting from the water plate frame 37. Thus when the motor is rotated to swing the arms 43 upwardly to the position A of FIGURE 4, the tension springs 44 will be slightly extended to hold the water plate snugly but resiliently against the bottom edges of the freezing cell walls. For the best results a small magnet 40 may be arranged to engage an armature 46 on one or both of the arms 43 to prevent creeping movement of the shaft 42 and motor. Also, if desired, the points of connection between the springs and the water plate frame 37 may be spaced apart or offset from each other to avoid any tendency or creeping movement due to the tension of these springs.

Downward swinging movement of the water plate 36 and its frame away from the freezing cells is accomplished by energizing the motor 41 to move the shaft 42 about a half turn. This causes the parts to swing from the position A to the position B of FIGURE 4 and allow the water plate to assume an angle of about 30 degrees to the horizontal. It will be noted that the arms 43 are each provided with a cam surface 47 arranged to engage the top edges of the water plate frame 37 and urge the frame downwardly with sufficient force to loosen it from the ice cube grid after the freezing operation has taken place.

*The refrigeration system*

The refrigeration system employed in each of the freezing units consists essentially of a sealed compressor 51 arranged to compress a gaseous refrigerant and deliver it through the outlet fitting 52 of the compressor to a finned condensing coil 53 provided with a motor driven fan or blower 54 in a manner quite conventional in the art. The coil 53 cools and liquifies the refrigerant and passes it through a line 55 to an auxiliary heat exchanger 56 consisting of a double coil as illustrated in FIGURE 9 wherein the refrigerant is carried through a pipe or tube 57 held in direct contact and preferably welded to a water tube 58. From the heat exchanger 56 the refrigerant is conducted through a line 59 to a reservoir 61. A line 62 extends from the reservoir through a heat exchanger 63 to an expansion valve 64 and thence to a suitable evaporator coil 65 attached to and forming a permanent integral part of the top plate 34 of the freezing chamber. A refrigerant return line 66 leads from the evaporator coil 65 back to the heat exchanger 63 and thence back to the inlet 67 of the compressor 51. The expansion valve 64 is controlled by a thermostat bulb 68 located on the refrigerant return line 66 in a manner well understood in the art.

A hot gas bypass line 71 extends from the outlet 52 of the compressor 51 through a solenoid valve 72 and thence through a hot line 73 to the evaporator coils 65. Thus in the normal operation of the apparatus the gases fed through the compressor 51 will be liquified in the condenser 53, further cooled in the heat exchanger 56 and accumulated in the reservoir 61. From the reservoir 61 the liquid refrigerant will flow to the expansion valve 64 where the flow of refrigerant through the valve will be thermostatically controlled to feed the required amount of refrigerant through the evaporator coil 65. This action results in freezing ice cubes within the receptacle cells 35, and when the freezing cycle has been completed the ice cubes are automatically removed from the receptacle by mechanical operation of the water plate combined with heating of the surfaces of the cells 35 to release the cubes therefrom. This is accomplished by opening the solenoid valve 72 to permit hot gases from the refrigerant compressor to pass through the evaporator coil 65.

The water system

The machine is provided with a water connection 75 to supply the water necessary for the production of ice and to provide auxiliary water cooling for the refrigerant. In order to supply the water required for the manufacture of ice to the freezing unit the line 75 is connected to a solenoid actuated valve 76 and thence through a feed line 77 which discharges on the top plate 34 of the freezing chamber 31. The plate 34 includes a plurality of perforations 78 which permit the water to flow into the individual freezing cells 35, pre-cooling the water as it passes thru the cells 35 thru the water plate return holes 99 and into the tank 92.

The water supply line 75 is also connected through a feed line 78 to a pressure controlled valve 79 and thence to the tube 58 in the auxiliary water cooled heat exchanger 56 heretofore described. The water delivered to this heat exchanger is then fed through an outlet line 81 into a drain pan 82 disposed below the freezing unit, and thence through a drain tube 83 to the drain connection of the machine. The valve 79 is operated in response to refrigerant pressure and to this end it is connected to the reservoir 61 through a control tube 84. In the preferred form of the invention, as commercially manufactured, the valve 79 may be so set that it opens and supplies cold water to the auxiliary cooler 56 whenever the pressure in the refrigerant line reaches a predetermined limit.

The recirculation system

Accordingly to the present invention the freezing units include a water tank and local circulating system to move water continuously through the freezing cells as the freezing progresses. Thus a tank or reservoir 92 suspended below the water plate 36 of each unit is initially supplied with a predetermined volume of water and this water is continuously cooled and recirculated through the freezing chamber until the water required for making a single batch of ice cubes is completely frozen. The remaining water (referred to as dreg water) is then automatically flushed from the tank and directed to the drain pan of the machine and thence disposed of through a drain connection. By thus freezing water in a continual flowing state, the minerals, hardness and other impurities present in the supply water do not accumulate in the frozen product but become concentrated in the dreg water and are thus eliminated from the ice. As a result, the machine will produce crystal clear ice cubes having no perceptible color or cloudiness and consisting of water of much greater purity than the water supply provided.

The recirculation system of the mechanism is most clearly illustrated in FIGURES 3 and 4 from which it will be seen that the grid of the freezing chamber 31 is mounted in the upper portion of the compartment 27 while the water plate 36, frame 37 and tank 92 form a swinging closure unit hinged thereto at 38 and arranged to swing downwardly to discharge the ice (as at B) or to be raised upwardly substantially to close the lower open ends of the ice cells 35 (as at A). The plate 36 includes a perforation 93 located at the approximate center of each of the individual cube cells 35 and water from the tank 92 is supplied to these apertures through a series of elliptical plastic water supply tubes 94 (FIGURES 7 and 8). These water supply tubes 94 are in turn supplied through a header 95 (FIGURE 4) connected to a circulating pump 96 (FIGURE 3) and the inlet of the pump is connected to the bottom of the tank 92. Preferably, the supply line 97 between the pump and header is provided with a conical metal screen or filter 98 to prevent crystallization of water from clogging the supply tubes 94.

Excess water delivered to the cells through the apertures 93 and not immediately frozen passes through return ports 99 to the tank 92. The individual supply lines are also provided with bypass apertures 100 returning into the tank 92, so that constant circulation is maintained in the tubes 94. As a result, there is no tendency of the water to freeze in these tubes and the apertures 93 remain open until the individual cells into which they are directed are frozen solid. Plugs 101 are supplied at the end of each supply tube to permit cleaning.

The control instrumentalities

Since it is desirable that an ice making machine of the general type described here be completely automatic in operation, it is provided with control devices such that the water charge required for freezing and flushing is automatically measured and injected into the system as required, and the freezing and harvesting cycles of the mechanism are automatically alternated in proper time relation. According to the present invention these results are obtained by instrumentalities comprising water control apparatus best shown in FIGURES 5 and 6 hereof, working in connection with the electrical circuit illustrated in FIGURE 10.

In FIGURES 5 and 6 it will be seen that the invention is arranged to utilize a water level switch 107 actuated by a pilot water tank 105 suspended on the arm 106 of the switch by an appropriate link 108. The pilot tank 105 is vented as indicated at 109 and it is connected to the main tank 92 by a flexible tube 110. It follows that the water level in the pilot tank 105 will at all times correspond to the water level in the tank 92. The switch arm 107 is spring biased so that the weight of the pilot tank, when full, will hold the switch arm downwardly; but the weight of the empty tank will be overcome by the spring force of the switch arm.

It will also be noted from FIGURES 5 and 6 that the water level of the main tank 92 and pilot tank 105 is additionally controlled by a water control device comprising an open top box 111 with a central barrier 112 dividing the box into a recirculation sump 113 and a drain sump 114. The box is affixed to the frame 37 heretofore described in connection with the swinging water plate 36, and the sump 113 connected to the tank 92 by a port 115. Sump 114 is connected to the drip pan 82 by a drain tube 116.

A small tubular nozzle 118 is also mounted on the frame 37 and is connected to one end of the header 95 through a fitting 119 having an adjustable needle valve 120 mounted therein. The nozzle 118 is inclined upwardly and laterally with respect to the box 111. It is so positioned that a stream of water projected from it at relatively low pressure will fall short of the barrier 112, and return to the tank 92 through the port 115, although a stream projected at an increased pressure will overshoot the barrier, fall into the chamber 114, and be discharged into the drip pan 82 through the drain tube 116.

A collar 117 (FIGURES 5 and 6) near the output end of tube 118 prevents water from dripping down the tube 118.

Figure 10:
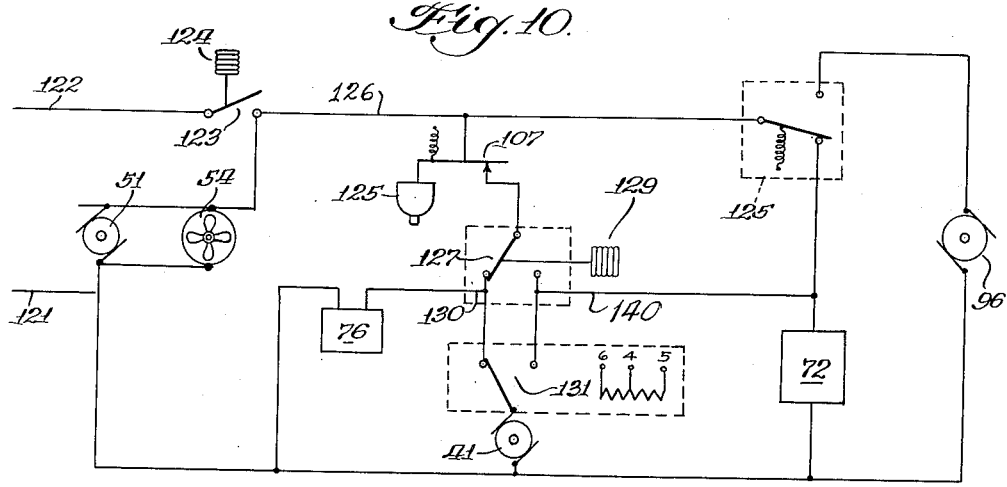
FIGURE 10 is a schematic wiring diagram of the electrical apparatus and control instrumentalities employed in the machine.
Figure 11:
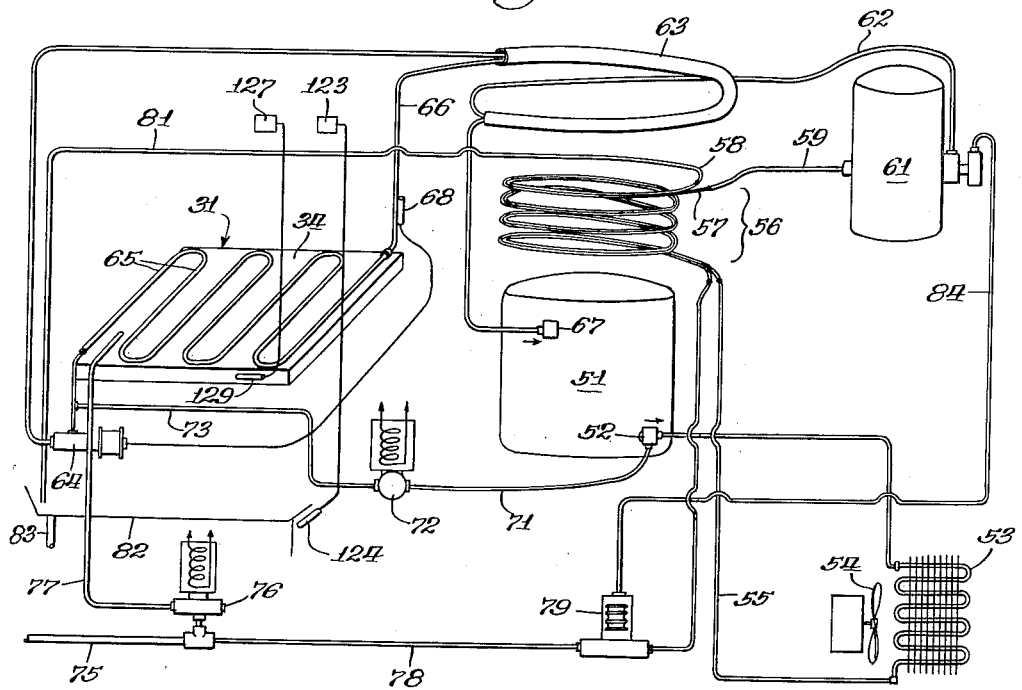
FIGURE 11 is a schematic diagram of the refrigeration and water circulation systems employed.

The electrical portions of the control circuit, best seen in FIGURE 10 are supplied by a pair of power leads 121 and 122. The lead 121 is connected directly to the refrigerant compressor 51, the motor of the condenser fan 54, the actuating motor 41, water pump motor 96, and to the solenoid valves 72 and 76. The opposite power lead 122 is connected directly to one terminal of a thermostatic bin switch 123 controlled by a bulb 124 in the upper portion of the ice bin of the assembly. Thus the bin switch 123, when closed, energizes a line 126 leading to the compressor motor 51, condenser fan motor 54, the water level switch 107, and also to the center arm of a spring loaded single pole, double throw toggle switch 125. The arm of the switch 125 is arranged to energize either the pump motor 96 or the solenoid valve 72, but is spring biased toward valve 72.

Switch 107 energizes a single pole double throw switch 127 controlled by a thermostat bulb 129 positioned on the evaporator 31. When the bulb is warm, switch 107 completes a circuit through line 130 to the water valve 76 and to one contact of double throw switch 131. When the bulb 129 is cold, switch 127 completes a circuit through line 140 to the opposite pole terminal of switch 131. The line 140 also extends to one terminal of switch 125 and to the "hot valve" 72, for reasons that will appear.

*The drain trap*

The ice bin 14 of the assembly has a drain aperture in the bottom wall 15 from which a drain tube 132 extends downwardly and laterally with an extension portion 133 extending to a point near the bottom of a drain trap 134. The top of the trap 134 is open. It is arranged to be connected to a sewer connection by an outlet duct 135 in the vertical wall of the trap above the outlet of the drain extension 133. It follows that any water drained from the ice cubes in the bin 14 will flow into the trap 134 and thence outwardly through the fitting 135 but the possibility of contamination of the ice by reason of a defective sewer connection is eliminated, since any back flow will merely overflow the trap 134, without permitting a reverse flow through the tube 132 into the ice bin.

The dreg water and the water used by the auxiliary heat exchanger 56 are discharged into the drip pans 82 of the individual freezing units in a manner heretofore described. These drip pans are connected to the drain through a downwardly extending tube 83, which enters the open top of the trap 134 but has its extreme end portion 136 bent to enter the drain fitting 135. This brings about a venturi action in the drain line, insuring free flow of the liquid from the trap to the sewer line. In the preferred form of the invention the tube 83 may also be provided with a small aperture 137 within the trap 134 in order that some of the relatively warm water normally discharged from the tube 83 may mix with and dilute the colder water 138 normally received from the ice bin through the tube 132. By this expedient the overall temperature of the water in the trap is kept high enough so that there is no tendency of condensation of moisture or "sweating" on the exterior surfaces of the trap and drain facilities.

*Operation of the freezing unit*

As the freezing cycle of the device is initiated, the reservoir tank 92 and water plate 36 are swung upwardly by the motor 41, bringing the water plate into snug resilient contact with the undersurface of the freezing grid as illustrated in FIGURES 4, 7 and 8. At this time, a bracket 138 strikes the arm of toggle switch 125, closing the electrical circuit (FIGURE 10) to pump 96 and opens the circuit to the hot gas valve 72. Since the thermostat bulb 129 on the freezing unit is warm at this time switch 127 completes a circuit to solenoid valve 76, and a charge of water is thus introduced into the system through the solenoid valve 76 and inlet line 77, which discharges the water on the top plate 34 of the freezing grid and permits it to flow downwardly through the openings 78 into the individual freezing cells and finally into the reservoir or tank 92. The valve 76 remains open until the water in the tank 92 has reached a predetermined level. As this occurs, the level of the water in the pilot tank 105 also rises to a height sufficient so that the weight of the pilot tank pulls the arm 106 of switch 107 downwardly, opening switch 107, closing the valve 76 and shutting off the water supply. The recirculating pump 96 is then running causing water from the tank 92 to be continuously moved upwardly through the screen 98 into the header 95 and thence into the several water supply tubes 94 to the individual supply apertures 93 in the water plate 36. Each of these apertures 93 directs a stream of water upwardly into one of the individual freezing cells 35, where the water is caused to flow downwardly along the cell walls. It will be understood, of course, that these walls are in refrigerated condition at this time, due to operation of the compressor 51. The contact of the water flowing over the metal surfaces of the cell walls will cause a thin layer to freeze thereon, while the overflow water will pass through the openings 99 (FIGURE 8) and return to the tank 92. This operation will be continuously repeated as the freezing cycle progresses, it being understood that as more and more water freezes on the walls of the freezing cells there will be progressively less and less returned to the tank. Thus the water level in the tank 92 will gradually fall to a point where only the dreg water used for flushing the system will remain. It has been found that satisfactory purification of the water frozen into the ice cubes may be accomplished by discharging about one third of the initial water charge as dreg water. For example, the machine here illustrated is arranged to take an original charge of about twelve pounds of water, of which about eight pounds is frozen into ice and the rest discharged. This accomplishes purification of the ice product as heretofore explained, as well as providing automatic flushing of the machine.

When the freezing cycle is substantially completed the thermostat bulb 129 will have been cooled enough so that the switch 127 disconnects the water valve 76 and energizes switch 131. Also, the individual cells are completely or almost completely filled with ice. This raises the water pressure and discharges the dreg water as heretofore described, closing switch 107, and starting motor 41 to open the under side of the freezing cells by swinging the water plate 36 and tank 92 downwardly about its hinged mounting to the position shown at B in FIGURES 3 and 4. Opening of the freezing cells is facilitated by the action of the cams 47 on the shaft 42 of the actuating motor 41, since these release cams are each arranged to contact the edge of the water plate frame 37. Continued rotation of the shaft 42 causes the crank arms 43 to swing downwardly and gradually lower the tank to the position shown at B in FIGURES 3 and 4. As this occurs an arm 139 mounted on the cam shaft 42 will engage and actuate the toggle switch 131 stopping the actuating motor 41, and downward movement of bracket 138 will release the spring biased toggle switch 125, stopping the recirculating motor and opening the solenoid valve 72.

*Operation of the electrical circuit*

At the start of the freezing cycle, a circuit from line 122 is completed thru bin control thermostatic switch 123, thru control tank switch 107, and thru thermostatically operated switch 127 to line 130, completing a circuit thru water valve 76. This also completes a circuit from line 122 to line 130 on double pole double throw switch 131, and thence to actuator motor 41. Water plate 36 and tank assembly 92 are thus lifted into horizontal position. At the same time there is a circuit from bin switch 123 through the normally closed contacts of spring loaded single pole double throw switch 125 to line 140 and to hot valve 72, holding hot valve open. When water plate 36 reaches upward position control plate 138 (FIGURE 3) pushes toggle switch arm 125 into upward position, opening the circuit to valve 72, closing the valve, and closing the circuit to start water pump 96. At the time that water plate 36 reaches upward position cam arm 43 strikes toggle 131 opening the circuit to line 130 and closing the circuit to line 140 and to the other pole of switch 131, stopping the actuator motor 41 and reversing its field so that when motor 41 is again energized it will rotate in the opposite direction.

Water continues to flow thru valve 76 until tank 92 is filled to its proper level, at which time pilot tank 105 is heavy enough to overcome the spring bias of switch 107, causing the circuit thru switch 107 to be broken. During the freezing cycle the thermostatic bulb 129 becomes cold and snaps switch 127, thus opening the circuit to line 130 and closing the circuit to line 140. Actuator motor 41 will not yet be operated, however, as switch 107 is still open.

When the ice cells 35 are full of ice and surplus water is dissipated thru the control stream nozzle 118 over the dam 112 to the drain 116 the control tank 105 is lightened sufficiently so that spring tension on switch 107 will close, completing a circuit thru switch 127 to line 140 and through switch 131 to actuator motor 41 causing the water plate 36 to be lowered. When the plate 36 reaches its lowermost position rod 139 (FIGURE 3) trips toggle 131 stopping 41 and reversing its field, so that when it is again energized it will rotate in the opposite direction.

At the same time that pilot tank 105 became light enough to complete the circuit through switch 107 a circuit was completed thru line 140 from switch 127 to switch 125 and thence to the hot valve 72, allowing hot gases to pass thru the evaporator 31 and start the defrost cycle. As the plate 36 moved down the spring loaded switch 125 opened the circuit to motor 96, stopping the water pump.

When the evaporator is sufficiently warm, the cubes will drop out and slide down the surface of the plate 36 into the bin 14. The evaporator 31 will then warm up rapidly, causing the switch 127 to open the circuit to line 140 and close the circuit to line 130. This opens the water valve 76 and energizes motor 41, causing plate 36 to rise to its upward position.

Should some cubes remain on the plate 36 the actuator motor 41 will continue to rotate, stretching the springs 44 until cam arm again operates the toggle switch 131. This opens the circuit to line 140 and closes the circuit to line 130, but since the plate 36 cannot close all the way, the circuit through switch 125 extends to line 140 in switches 127 and 136. This causes motor 41 to operate, opening plate 36 to its lower position. If cubes still do not clear, the plate 36 will continue to be lowered until they do clear, or until switch 125 can break the circuit to line 140 and move to its opposite position.

The circuit thru the line 140 is also used to operate the machine in case the circuit from power leads 121 to 122 should be interrupted (as by disconnecting the line plug) during the lowering of the plate 36, causing the plate to remain in this open position until the bulb 129 of switch 127 warms up sufficiently to close the circuit to line 130. Then when the power circuit from leads 121 and 122 is again completed, the circuit would be from switch 125 to lead 140 and to switch 127; thence through switch 131 to the actuator motor 41, which would lower the plate 36 to the lowermost position. The rod 139 would then snap the toggle switch 131 from line 140 to line 130 in order that the motor 41 would then operate in the opposite direction.

When the ice bin is full, the thermostat bulb 124 on switch 123 will open the circuit to line 126, shutting off the entire mechanism.

The ice delivery

When the "hot valve" 72 is opened as described above, hot gases from the refrigeration compressor 51 are by-passed directly to the evaporator coils 65, so that the freezing cells 35 of the evaporator 31 are rapidly heated. The result is that the cubes are released from the inverted cells in such a manner that the cubes may drop downwardly onto the then inclined plate 36. For best results, however, it has been learned that it is desirable to maintain a thin connecting layer of ice between the individual cubes so that the weight of the entire group of cubes will be imposed on any few cubes which may be slow to release themselves. It follows that all of the cubes will fall from the freezing grid as a unit and will be broken up only as they strike the plate 36, from which they are discharged into the bin of the machine.

It will be observed from FIGURE 4 particularly, that when the plate 36 is in its lowermost position, the ice cubes dropped thereupon will be discharged laterally to the right in a manner to pass through the chute 141 in the bottom of each of the individual freezing sections 12. The arrangement is such that the cubes so discharged are free to fall clear of the freezing apparatus through the similar chute 141 in the next lowermost freezing unit, and thence into the ice bin in the base of the machine.

Any dreg water and free water formed by heating of the freezing cells will be directed into the drip pans 82 by the deflectors 142.

Conclusion

It follows that, with this arrangement, any number of individual freezing sections may be stacked one upon another to provide an assembly of plural ice making units feeding one common bin at the bottom of the group, and thus providing almost any ice cube capacity required in a machine of this general type. Furthermore, since the operation of each of the units is essentially independent of the other, this form of the machine is not as subject to breakdown as other types in which malfunction of any one portion puts the entire machine out of order.

It will also be evident that the teachings of the present disclosure make possible the provision of an improved yet simplified ice making machine capable of producing a supply of ice cubes of clear solid ice in regular and uniform and cubical form. The machine produces ice of greater purity than the water supply furnished to it for the reasons pointed out herein, and its product is characterized by absence of any porosity or cloudiness in the ice. The machine is entirely automatic in its operation and the relationship of the parts is such that while each of a plurality of ice making units are operatively independent of each other yet they coact with each other in a manner such that the ice manufactured by all units is accumulated in a common bin at the bottom.

The injection of the water charge, into the machine, and the beginning and termination of the freezing and harvesting cycles are automatically controlled by unique devices utilizing a pressure sensitive stream of water, adapted to coordinate the movements of the various parts of the mechanism with the freezing and cube releasing cycles.

Thus accurate and efficient control of the length of the freezing cycle is accomplished so that the ice is harvested as soon as the cubes are completely frozen, without undue tendency to harvest partly frozen cubes and without tendency to let completely frozen cubes remain too long in the freezing cells. With all of the above, the invention provides a freezing unit of greater efficiency than heretofore developed, capable of achieving greater ice production than similar units of the same power ratings.

Having thus described our invention, what we claim as new and desire to protect by United States Letters Patent is:

1. In an ice making machine having a freezing chamber and an evaporator in heating exchange relation, the combination of means to initiate a freezing cycle for said evaporator; a water tank; means to charge the tank with a predetermined charge of water to be frozen, at least one water supply line to convey water from said tank to the freezing chamber and at least one water return line whereby excess water delivered to the freezing chamber will be returned to the tank; recirculating means comprising a pump to cause substantially continuous circulation of water from said tank through the freezing chamber and back to the tank whereby the water in the tank will be cooled to substantially freezing temperature during the recirculating thereof, with control means responsive to the formation of ice in the freezing chamber to terminate the freezing cycle; said control means consisting of a water nozzle in communication with the water supply line; a water return receptacle spaced near to said nozzle whereby water projected therefrom at low pressure as encountered during the normal freezing cycle will be returned to the tank and recirculated, and a water discharge trap spaced more remotely from said nozzle whereby water projected therefrom at a higher pressure as encountered at the completion of the freezing cycle will be expelled from the recirculation system by the continued operation of the recirculation pump, to discharge the unfrozen dregs of the water charge.

2. In an ice making machine, a single ice bin having a frame including closed back and end walls with an access doorway in the front and an ice inlet opening in the top; in combination with a plurality of independent and substantially identical automatic ice making units each having a separate frame consisting of a back, end walls and front panel generally corresponding to the size and shape of the aforementioned bin and adapted to lie in contiguous relation thereto; the frame of one of said units being adapted to rest directly upon and be supported in interlocking relation with the top of the bin and with the frame of each of said other units adapted to rest directly upon and be supported in interlocking relation with the top of the ice making unit directly below it whereby a plurality of said ice making units may be stacked upon each other and interlocked against lateral displacement; each of said ice making units having a complete and separate refrigeration system including a compressor, condenser and evaporator with a vertical ice discharge opening extending completely through the unit in a generally central position with respect thereto; with a water freezing chamber disposed beside said ice discharge opening and means for diverting ice frozen in said freezing chamber in a downward and lateral direction into said discharge opening, so that ice manufactured in the upper of said units will be delivered through the discharge opening of the units positioned therebelow, whereby all ice produced by all units will be accumulated in the aforementioned single bin.

3. In an ice making machine, a single ice bin having a frame including closed back and end walls with an access doorway in the front and an ice inlet opening in the top; in combination with a plurality of independent and substantially identical automatic ice making units each having a separate frame consisting of a back, end walls and front panel generally corresponding to the size and shape of the aforementioned bin andadapted to lie in contiguous relation thereto; the frame of one of said units being adapted to rest directly upon the top of the bin and with the frame of each of said other unit adapted to rest directly upon the top of the ice making unit directly below it whereby a plurality of said ice making units may be stacked upon and wholly supported by each other; each of said ice making units having a complete and separate refrigeration system including a compressor, condenser and evaporator with a vertical ice discharge opening extending completely through the unit in generally central position with respect thereto; with a water freezing chamber disposed beside said ice discharge opening and means for diverting ice frozen in said freezing chamber in a downward and lateral direction into said discharge opening, so that ice manufactured in the upper of said units will be delivered through the dicharge opening of the units positioned therebelow, whereby all ice produced by all units will be accumulated in the aforementioned single bin.

4. In an ice making machine, in combination, a plurality of independent and substantially identical automatic ice making units each having a separate frame consisting of a back, end walls and front panel generally corresponding as to size and shape and adapted to lie in contiguous relation to each other; said units being adapted to rest directly upon each other with the bottom of one unit directly upon and supported in interlocking relation with the top of the unit directly below it; each of said ice making units having a complete and separate refrigeration system including a compressor, condenser and evaporator with a vertical ice discharge opening extending completely through the unit in a generally central position with respect thereto; with a water freezing chamber disposed beside said ice discharge opening and means for diverting ice frozen in said freezing chamber in a downward and lateral direction into said discharge opening, so that ice manufactured in the upper of said units will be delivered through the discharge opening of the units positioned therebelow, whereby all ice produced by all units may be accumulated in a single bin.

5. In an ice making machine, in combination, a plurality of independent and substantially identical separate self-contained automatic ice making units each having separate but identical back, end walls and front panel generally corresponding to the size and shape of each other and adapted to lie in contiguous relation to each other; each of said ice making units having a complete and separate refrigeration system including a compressor, condenser and evaporator with a vertical ice discharge opening extending completely through the unit in a generally central position with respect thereto; with a water freezing chamber disposed beside said ice discharge opening and means for diverting ice frozen in said freezing chamber in a downward and lateral direction into said discharge opening, so that ice manufactured in the upper of said units will be delivered through the discharge opening of the units positioned therebelow, whereby all ice produced by all units may be accumulated in a single bin.

6. Ice cube freezing apparatus comprising a freezing chamber consisting of a multiplicity of open bottom inverted individual cells with a refrigerant evaporator in heat exchange relation therewith; a water plate common to all of the cells of the freezing chamber and extending across the bottoms thereof for substantially closing the individual cells during a freezing cycle of the evaporator; a water system for supplying water to said cells including a restricted water port in said water plate in communication with each of said cells and a plurality of water supply tubes leading to said water ports, with means including a water projecting nozzle and a water trap with at least two separate water receiving receptacles differentially spaced from the nozzle to receive the water in one trap under low pressure conditions and to receive the water in the other trap under high pressure conditions responsive to obstruction of said restricted water ports by the formation of ice thereover for terminating the freezing cycle of said evaporator.

7. Ice cube freezing apparatus comprising a freezing chamber consisting of a multiplicity of individual cells with a refrigerant evaporator in heat exchange relation therewith; means for substantially closing the individual cells during a freezing cycle of the evaporator; a water system for supplying water to said cells including restricted water ports in each of said cells, and means including a water projecting nozzle and a water trap with at least two separate water receiving receptacles differentially spaced from the nozzle to receive the water in one trap under low pressure conditions and to receive the water in the other trap under high pressure conditions responsive to obstruction of said restricted water ports by the formation of ice thereover for terminating the freezing cycle of said evaporator.

8. Ice cube freezing apparatus comprising a freezing chamber consisting of a multiplicity of open bottom inverted individual cells with a refrigerant evaporator in heat exchange relation therewith; a water plate for substantially closing the individual cells during a freezing cycle of the evaporator; a water system for supplying water to said cells including restricted water ports in each of said cells, and means including a water projecting nozzle and a water trap with at least two separate water receiving receptacles differentially spaced from the nozzle to receive the water in one trap under low pressure conditions and to receive the water in the other trap under high pressure conditions responsive to obstruction of said restricted water ports by the formation of ice thereover for terminating the freezing cycle of said evaporator and initiating heating of the freezing chamber to release the ice cubes therefrom.

9. In an ice making machine, a single ice bin having an elongated frame including closed back and end walls with an access doorway in the front and in ice inlet opening in the top; in combination with a plurality of substantially identical automatic ice making units each having a separate elongated frame consisting of a back, end walls and front panel generally corresponding to the size and shape of the aforementioned bin and adapted to lie in contiguous relation thereto; the frame of one of said units being adapted to rest directly upon and be supported in interlocking relation with the top of the bin and with the frame of each of said other unit adapted to rest directly upon and be supported in interlocking relation with the top of the ice making unit directly below it whereby a plurality of said ice making units may be stacked upon each other and interlocked against lateral displacement; each of said ice making units having a central partition dividing the unit into an evaporator housing at one end and a compressor housing at the other end, with a complete and separate refrigeration system in each unit including a compressor and condenser in the compressor housing and an evaporator and freezing chamber in the evaporator housing with a vertical ice discharge opening extending completely through the unit in a generally central position with respect thereto; with means for diverting ice frozen in said freezing chamber in a downward and lateral direction into said discharge opening, so that ice manufactured in the upper of said units will be delivered through the discharge opening of the units positoned therebelow, whereby all ice produced by all units will be accumulated in the aforementioned single bin.

References Cited in the file of this patent

UNITED STATES PATENTS

| | | |
|---|---|---|
| 706,510 | Barrath | Aug. 12, 1902 |
| 1,321,097 | Gonzalez | Nov. 11, 1919 |
| 1,510,147 | Keith | Sept. 30, 1924 |
| 2,220,175 | Rice | Nov. 5, 1940 |
| 2,443,203 | Smith | June 15, 1948 |
| 2,493,488 | Jordan | Jan. 3, 1950 |
| 2,542,892 | Bayston | Feb. 20, 1951 |
| 2,549,747 | Leeson | Apr. 17, 1951 |
| 2,612,030 | Ploeger | Sept. 30, 1952 |
| 2,633,004 | Leeson | Mar. 31, 1953 |
| 2,633,005 | Laver | Mar. 31, 1953 |
| 2,656,686 | Bayston | Oct. 27, 1953 |
| 2,677,249 | Mason | May 4, 1954 |
| 2,677,389 | Jisha | May 4, 1954 |
| 2,691,275 | Andrews | Oct. 12, 1954 |
| 2,717,506 | Anderson | Sept. 13, 1955 |
| 2,722,110 | Denzer | Nov. 1, 1955 |
| 2,726,514 | Capehart | Dec. 13, 1955 |
| 2,729,070 | Ames | Jan. 3, 1956 |
| 2,740,265 | Bayston | Apr. 3, 1956 |
| 2,747,375 | Pichler | May 29, 1956 |
| 2,763,996 | Lees | Sept. 25, 1956 |
| 2,875,877 | Hoban | Mar. 3, 1959 |

UNITED STATES PATENT OFFICE
CERTIFICATION OF CORRECTION

Patent No. 3,009,336                                        November 21, 1961

John R. Bayston et al.

It is hereby certified that error appears in the above numbered patent requiring correction and that the said Letters Patent should read as corrected below.

Column 12, line 9, after "units" insert -- in vertically stacked relation and supported one upon another and --.

Signed and sealed this 24th day of April 1962.

(SEAL)
Attest:

ESTON G. JOHNSON
Attesting Officer

DAVID L. LADD
Commissioner of Patents